3,005,835
D-HOMO-18-NORESTRA-1,3,5(10)-TRIEN-17a-ONES AND INTERMEDIATES THERETO
William F. Johns, Morton Grove, Ill., assignor to G. D. Searle & Co., Chicago, Ill., a corporation of Delaware
No Drawing. Filed Sept. 13, 1960, Ser. No. 55,721
7 Claims. (Cl. 260—397.5)

The present invention is concerned with novel D-homo-18-nor-steroids and also with novel intermediates in the manufacture thereof. More particularly, these D-homo-18-nor compounds are D-homo-18-norestra-1,3,5(10)-trien-17a-ones of the structural formula

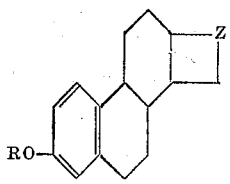

wherein R is a lower alkyl radical and Z is a member of the class comprising oxopropenylene

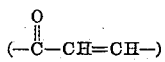

and 1-oxo-3-hydroxytrimethylene

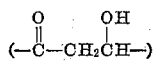

radicals. The lower alkyl radicals represented by R are typified by methyl, ethyl, propyl, butyl, pentyl, hexyl, and the branched-chain isomers thereof.

Starting materials suitable for the manufacture of the compounds of this invention are the 3-(lower alkyl) ethers of estra-1,3,5(10)-triene-3,17β-diol. Treatment of these substances with boric acid at an elevated temperature results in dehydration and rearrangement to produce a mixture containing the corresponding 13α-17-methyl-16,17-dehydro compounds as shown below:

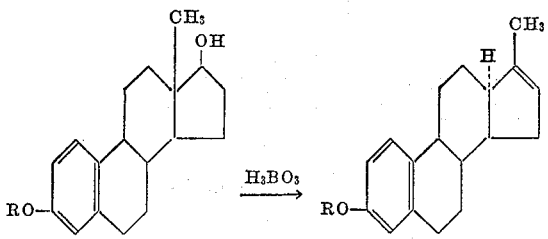

Hydroxylation of the 16,17-double bond, suitably with osmium tetroxide, results in the corresponding instant intermediate 16α,17α-diols. This transformation is illustrated as follows:

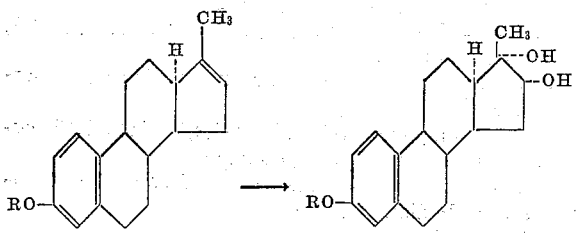

The latter diols are cleaved, for example by means of periodic acid to yield the instant intermediate octahydrophenanthrene derivatives, which are cyclized, typically by treatment at room temperature with dilute aqueous potassium hydroxide in methanol, to afford the novel 16β-hydroxy-17α-ones of this invention. This two-step process can be represented as follows:

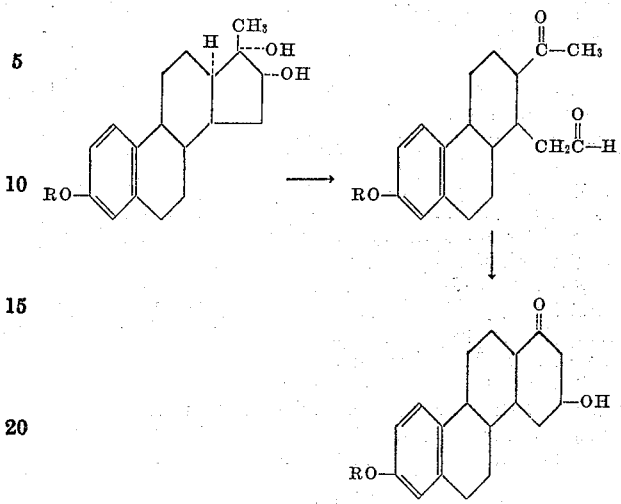

The latter four-step process is exemplified by the reaction of estra-1,3,5(10)-triene-3,17β-diol 3-methyl ether with boric acid to afford a mixture containing 17-methyl-13α-18 - norestra - 1,3,5(10),16-tetraen - 3 - ol 3 - methyl ether. Treatment of this mixture in ether with osmium tetroxide results in 17β-methyl-13α-18-norestra-1,3,5(10)-triene-3,16α,17α-diol 3-methyl ether, which is cleaved with periodic acid to afford 1-formylmethyl-7-methoxy-1,2,3,4,4a,9,10,10a-octahydro-2-phenanthryl methyl ketone. The latter dicarbonyl compound is cyclized by room temperature treatment with aqueous potassium hydroxide in methanol to yield 16β-hydroxy-3-methoxy-D-homo-18-norestra-1,3,5(10)-trien-17a-one.

The 16-dehydro-17a-ones of this invention can be prepared by dehydration of the aforementioned 16β-hydroxy-17a-ones, preferably by heating with aqueous potassium hydroxide in methanol. A specific illustration of this process is the conversion of 16β-hydroxy-3-methoxy-D-homo-18-norestra-1,3,5(10)-trien-17a-one to 3-methoxy - D - homo - 18 - norestra - 1,3,5(10),16-tetraen-17a-one.

The D-homo-18-nor compounds of this invention are useful as a result of their valuable pharmacological properties. They are, for example, anti-estrogenic agents as evidenced by their ability to inhibit the sexual changes accompanying the administration of estrogens. In addition, the instant 16-dehydro-17a-ones are lipodiatic agents in consequence of their ability to decrease the serum concentration of cholesterol and the corresponding cholesterol/phospholipid ratio.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

An intimate mixture of 30 parts of estra-1,3,5(10)-triene-3,17β-diol 3-methyl ether and 7.5 parts of boric acid is heated at 160° for about 20 minutes, then distilled in vacuo to afford the crude product, which is dissolved in benzene. This organic solution is washed with aqueous potassium bicarbonate, dried over anhydrous magnesium sulfate, and concentrated to dryness in vacuo.

A solution of 9.4 parts of the latter residue in 107 parts of ether is treated with 8.9 parts of osmium tetroxide, and the resulting mixture is stirred at room temperature for about 15 hours. This reaction mixture is then diluted with 160 parts of ethanol and 100 parts of water containing 5 parts of sodium sulfite to afford a mixture which is heated at reflux for about one hour, then filtered to remove the resulting precipitate. The filter cake is washed with hot ethanol, and the filtrate is concentrated to about 50 parts by volume, then diluted with water and extracted with benzene. The benzene extract is washed with water, dried over anhydrous magnesium sulfate, and concentrated to dryness in vacuo. A solution of the semi-crystalline residue in benzene is chromatographed on silica gel, and the chromatographic column is eluted with 15% ethyl acetate in benzene. Concentration of the eluate to dryness followed by recrystallization of the residue from acetone-petroleum ether affords pure 17β-methyl-18-nor-13α-estra-1,3,5(10)-triene-3,16α,17α-triol 3-methyl ether, M.P. about 184–187°; [α]$_D$=+91.8°. This diol is characterized by maxima in the infrared at about 2.85, 2.99, 6.18, and 6.32 microns.

The substitution of an equivalent quantity of estra-1,3,5(10)-triene-3,17β-diol 3-ethyl ether in the process of this example results in 17β-methyl-18-nor-13α-estra-1,3,5(10)-triene-3,16α,17α-triol 3-ethyl ether.

*Example 2*

To a solution of one part of 17β-methyl-18-nor-13α-estra-1,3,5(10)-triene-3,16α,17α-diol 3-methyl ether in 120 parts of methanol containing 3 parts of pyridine is added a solution of one part of periodic acid in 10 parts of water, and this reaction mixture is stored at room temperature for about one hour. Dilution of the mixture with water results in crystallization of the product, which is collected by filtration, washed with water, and dried. Recrystallization from petroleum ether yields pure 1-formylmethyl-7-methoxy-1,2,3,4,4a,9,10,10a-octahydro-2-phenanthryl methyl ketone, M.P. about 91–93°; [α]$_D$=+62°. This substance displays infrared maxima at about 3.66, 5.82, 6.23, and 6.33 microns.

By substituting an equivalent quantity of 17β-methyl-18-nor-13α-estra-1,3,5(10)-triene-3,16α,17α-triol 3-ethyl ether and otherwise proceeding according to the herein described processes, 7-ethoxy-1-formylmethyl-1,2,3,4,4a,9,10,10a-octahydro-2-phenanthryl methyl ketone is obtained.

*Example 3*

To a solution of 6.9 parts of 1-formylmethyl-7-methoxy-1,2,3,4,4a,9,10,10a-octahydro-2-phenanthryl methyl ketone in 240 parts of methanol is added 4 parts of 10% aqueous potassium hydroxide. This reaction mixture is stored at room temperature for about one hour, then diluted with water and extracted with benzene. The organic layer is separated, washed with water, dried over magnesium sulfate and concentrated to dryness in vacuo. A solution of the residue in benzene is chromatographed on silica gel. Elution with 25% ethyl acetate in benzene yields a fraction, which is recrystallized from acetone to afford pure 16β-hydroxy-3-methoxy-D-homo-18-norestra-1,3,5(10)-trien-17a-one, M.P. about 174–180°; [α]$_D$=+39°. This substance is characterized by infrared maxima at about 2.85, 5.86, 6.22, and 6.36 microns.

The substitution of an equivalent quantity of 7-ethoxy-1-formylmethyl-1,2,3,4,4a,9,10,10a-octahydro-2-phenanthryl methyl ketone in the process of this example results in 3-ethoxy-16β-hydroxy-D-homo-18-norestra-1,3,5(10)-trien-17a-one.

*Example 4*

To a solution of 2.2 parts of 16β-hydroxy-3-methoxy-D-homo-18-norestra-1,3,5(10)-trien-17a-one in 240 parts of methanol is added 60 parts of 10% aqueous potassium hydroxide, and this reaction mixture is heated at reflux in a nitrogen atmosphere for about one hour, then cooled and diluted with water. The resulting precipitate is collected by filtration, dissolved in benzene, then chromatographed on silica gel. The column is eluted with 5% ethyl acetate in benzene, and the fraction obtained by concentration of this eluate is recrystallized from acetone-petroleum ether to afford pure 3-methoxy-D-homo-18-norestra-1,3,5(10),16-tetraen-17a-one, M.P. about 163–164°; [α]$_D$=+38°. It displays maxima in the infrared at about 5.96, 6.22, and 6.37 microns and ultraviolet maxima at about 222 and 278 millimicrons with molecular extinction coefficients of about 15,400 and 1,920 respectively.

When an equivalent quantity of 3-ethoxy-16β-hydroxy-D-homo-18-norestra-1,3,5(10)-trien-17a-one is substituted in the herein-described process, 3-ethoxy-D-homo-18-norestra-1,3,5(10),16-tetraen-17a-one is obtained.

What is claimed is:

1. A compound of the structural formula

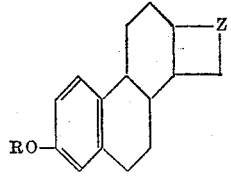

wherein R is a lower alkyl radical and Z is selected from the group consisting of oxopropenylene (—C(O)—CH=CH—)

and 1-oxo-3-hydroxytrimethylene (—C(O)—CH$_2$CH(OH)—)

radicals.

2. A compound of the structural formula

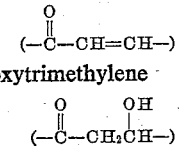

wherein R is a lower alkyl radical.

3. A compound of the structural formula

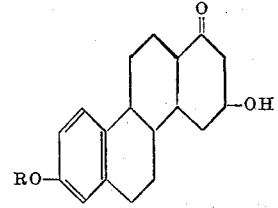

wherein R is a lower alkyl radical.

4. 16β-hydroxy-3-methoxy-D-homo-18-norestra-1,3,5(10)-trien-17a-one.

5. 3-methoxy-D-homo-18-norestra-1,3,5(10),16-tetraen-17a-one.

6. 1-formylmethyl-7-methoxy-1,2,3,4,4a,9,10,10a-octahydro-2-phenanthryl methyl ketone.

7. 3-methoxy-17β-methyl-18-nor-13α-estra-1,3,5(10)-triene-16α,17α-diol.

No references cited.